May 15, 1962 J. H. ODOM ET AL 3,034,287
PARKING METER
Filed Oct. 11, 1957 4 Sheets-Sheet 1

John H. Odom
Phillip E. Murr
INVENTORS

John H. Odom
Phillip E. Murr
INVENTORS

May 15, 1962 J. H. ODOM ET AL 3,034,287
PARKING METER
Filed Oct. 11, 1957 4 Sheets-Sheet 3
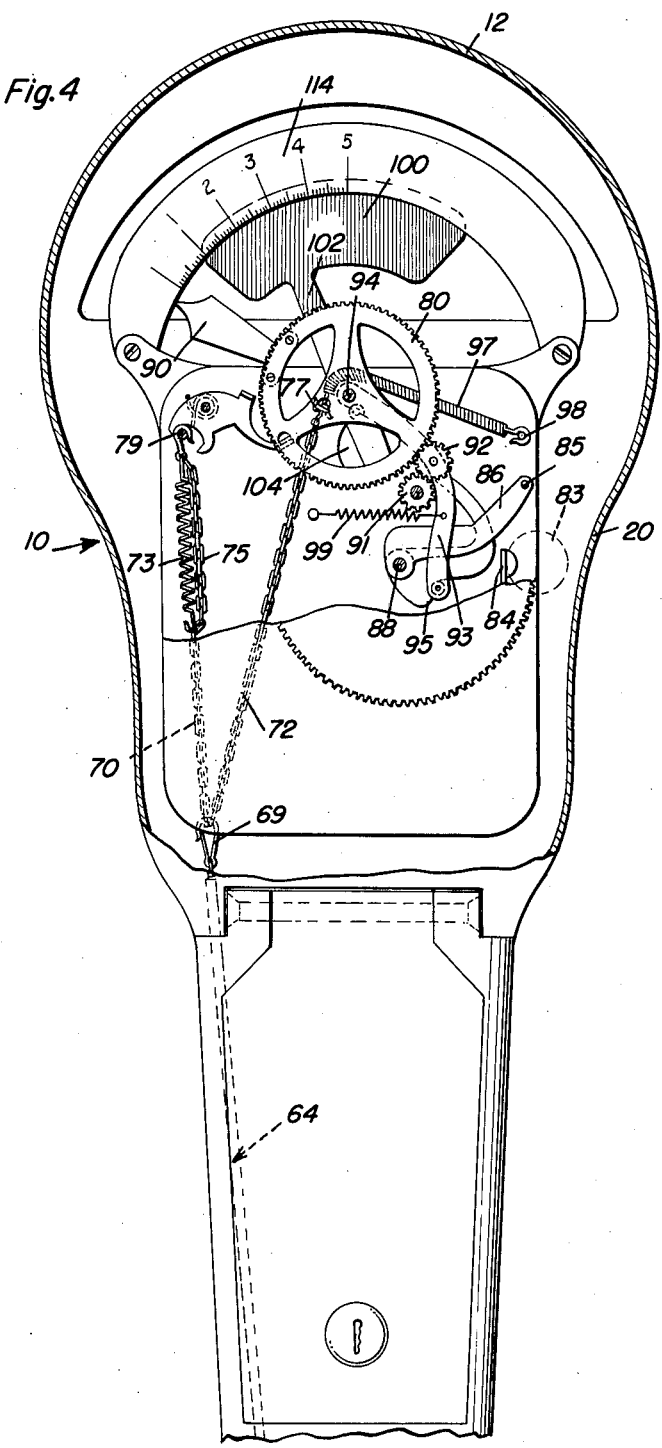
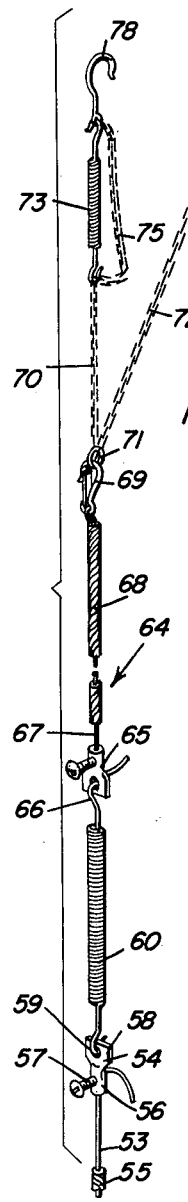
John H. Odom
Phillip E. Murr
INVENTORS

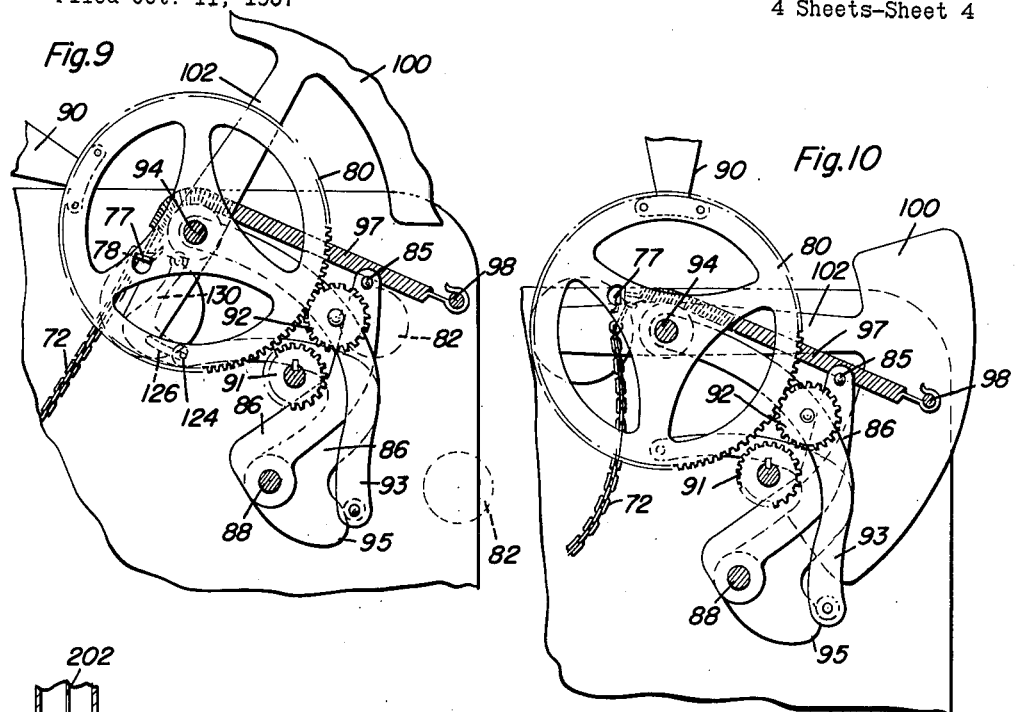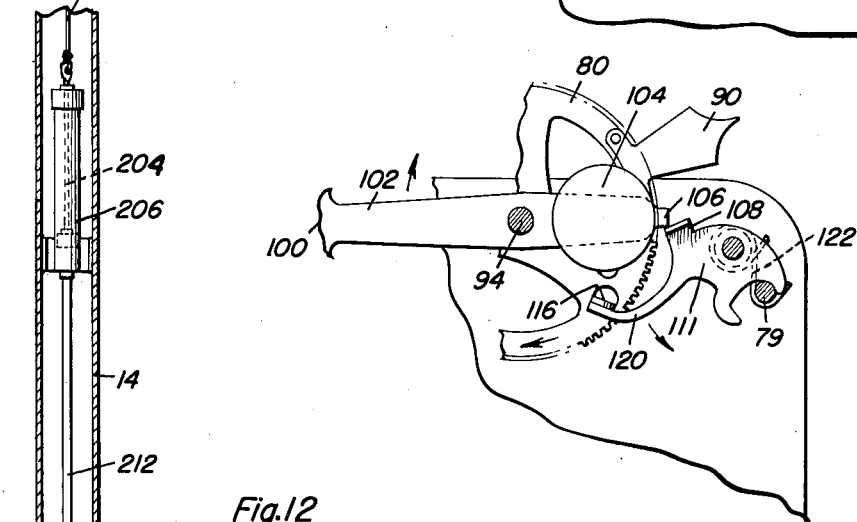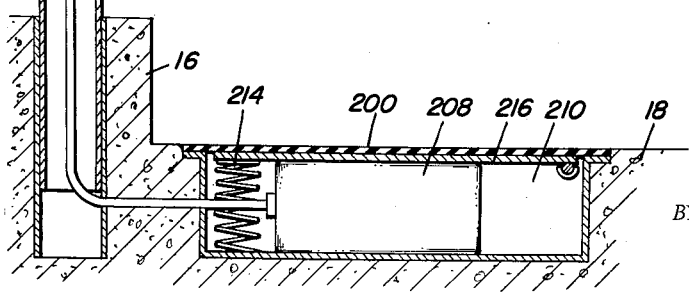

3,034,287
PARKING METER
John H. Odom, 303½ W. Park Ave., Tampa, Fla., and Phillip E. Murr, Jonesboro, Tenn.; said Murr assignor to said Odom
Filed Oct. 11, 1957, Ser. No. 689,598
5 Claims. (Cl. 58—142)

This invention relates to parking meters and more particularly to improvements in parking meters enabling them to function more effectively.

An object of the invention is to provide an attachment effective to prevent normal operation of a parking meter, said attachment however being selectively disabled by one wheel of a motor vehicle correctly located with respect to the meter and metered space, so that upon deposit of a coin in the meter will operate normally to cause the pointer to indicate the time rental of the space. When a "violation" or "expired" flag is used in the meter, the invention will not allow the flag to remain depressed when a nickel is inserted in the meter if the motorist does not have his motor vehicle wheel correctly positioned in the parking space.

The ensuing advantages of the invention are numerous. One salient advantage is that the motor vehicles occupying the parking spaces will have to be correctly located in the rented parking space and there will be no overhanging from one space to the next. Accordingly, usurpation of a part of an adjacent parking space is avoided.

Another advantage of the invention is that it causes the parking meter to automatically remove the time remaining on the parking meter when the motorist leaves his rented parking space before the ordinary expiration. Therefore, the municipality or like governing body will be able to realize its correct income from the parking spaces in that the motorist renting a parking space but leaving that space before his full rented time has expired, must automatically remove that time from the meter because this is achieved as soon as the motor vehicle wheel is removed from the treadle that is operatively connected with the meter.

There are a number of manufacturer's makes of parking meters that are available at the present time. The "Park-O-Meter" brand manufactured by Park-O-Meter Company, at Oklahoma City, is one meter which is fully automatic in that when a coin is deposited, it is unnecessary to turn any handles, pull levers, etc. The coin sets a spring or clock motor in a motion and through a mechanical movement, causes the time pointer to move to the correct hour or hours rented and the depression of a flag. The principles of our invention are applicable by the inclusion of a treadle mounted near the curb adjacent to the parking meter. An elongated, elastic assembly is operatively connected with the treadle and attaches to the parking meter mechanism to achieve the previously described objects. Although we have shown parts of the referenced one form of exemplary parking meter, we believe our invention to be applicable to other manufacturer's makes of parking meters.

Other objects and features of importance will become apparent in following the description of the illustrated form of the invention.

FIGURE 4 is a front elevational view of a parking meter head with parts broken away to illustrate some of the internal detail of the parking meter and particularly to illustrate how our attachment is connected with a mechanism of the meter.

FIGURE 5 is a perspective view of a part of the elongate elastic assembly by which the parking meter operation is altered in accordance with the invention.

FIGURE 6 is a schematic representation which shows the removal of the time from a meter when the motor vehicle wheel is moving out of the parking space, the removal of time accomplished by having the expiration flag appear and by having the time pointer returned to zero.

FIGURE 7 is a schematic representation showing the vehicle wheel in a parking space but failing to depress the treadle because of improper location of the vehicle in a parking space, the meter flag being depressed in response to the application of a coin in the meter, but returning to the "expired" position and this view also showing that the pointer does not move the position to indicate space rental even though a coin is placed in the meter.

FIGURE 8 is a schematic representation showing the vehicle wheel in the proper place in the parking space and showing the pointer as having moved to the minute or hourly rental with the expiration flag depressed.

FIGURE 9 is a fragmentary elevational view of the parking meter mechanism showing what happens when a coin is applied to the meter but the motor vehicle wheel is not on the treadle (FIGURE 7).

FIGURE 10 is a fragmentary elevational view similar to that of FIGURE 9 showing the normal operation of the meter when a coin is applied and also showing what happens to our attachment when a coin is applied in the meter and the vehicle wheel (FIGURE 8) is properly located on the treadle.

FIGURE 11 is a fragmentary elevational view showing the means to releasably hold the expiration flag in the depressed position, this structure being original equipment in the meter.

FIGURE 12 is a fragmentary sectional view showing a modification of our invention.

Figure 3:
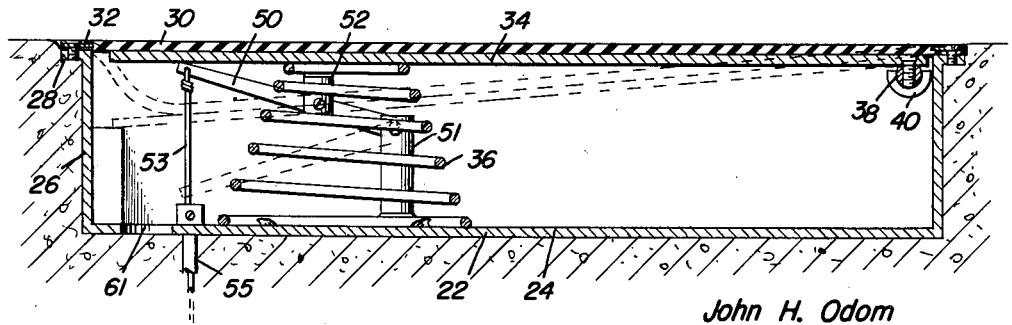
FIGURE 3 is a transverse sectional view taken on the line 3—3 of FIGURE 2.

In the accompanying drawings we have shown a typical parking meter installation. Meter 10 is constructed of a head 12 and is mounted on a post 14 near curb 16 of street 18. The parking meter housing 20 remains unaltered, as does post 14. We provide a treadle 22 in the street and at a location which will properly center an average motor vehicle in the metered parking space. Treadle 22 consists of an upwardly opening casing that has a bottom wall 24 and side walls 26. Flange 28 extends around the top edge of the side walls 26. A flexible cover 30 which may be made of rubber or plastic, is held fastened to the flange 28 by bolts, machine screws, etc. which pass through a frame 32 at the edges of the cover. Treadle plate 34 is located beneath the cover 30 and is held in a raised position by compression spring 36 seated in the casing and on the casing bottom 24. One edge part of the treadle plate 34 is attached to spindle 38, the latter carried in bearings 40 and 42 on the side walls of the treadle casing. Stops 44 and 46 are at two corners of the treadle casing and they limit the downward movement of the treadle plate 34. The upward motion of the treadle plate is limited by other stops or by cover 30 in that the spring 36 can be so selected that it would ordinarily hold the treadle plate 34 practically horizontal when the spring is fully expanded (FIGURE 3).

Figure 2:
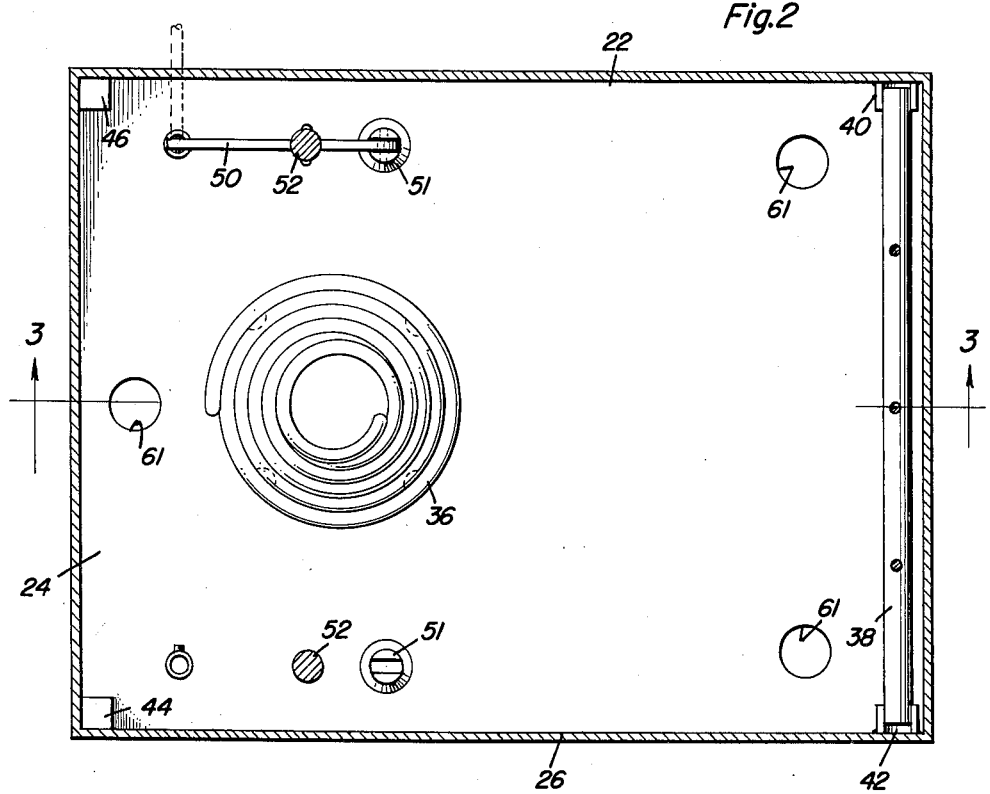
FIGURE 2 is a horizontal sectional view through the treadle that is located alongside of the curb and parking meter.

A rocker 50 is mounted for pivotal movement on a post 51 that rises from the bottom wall of the treadle casing. Rod 52 is secured to the plate 34 and is pivoted to the rocker 50 intermediate the ends of the rocker. Bowden wire 53 is secured to an end of rocker 50 and has an end attached to the adjustable coupling 54 (FIGURE 5). The sheath 55 of the Bowden wire is secured to the bottom 24 of the treadle casing so that as the treadle plate 34 is operated (depressed) by the presence of a motor vehicle wheel. Bowden wire 53 is pushed through its sheath 55 to transmit the pushing force to coupling 54. The coupling 54 is made of a sleeve 56 that has a set-screw 57 bearing against the Bowden wire and that has a flattened part 58 with a hole through which the hook 59 on the end of spring 60 is engaged. The Bowden wire 53 and the remainder of the structure shown in FIGURE 5 is added to the parking meter 10, as is the treadle construction of FIGURES 2 and 3.

Figure 1:
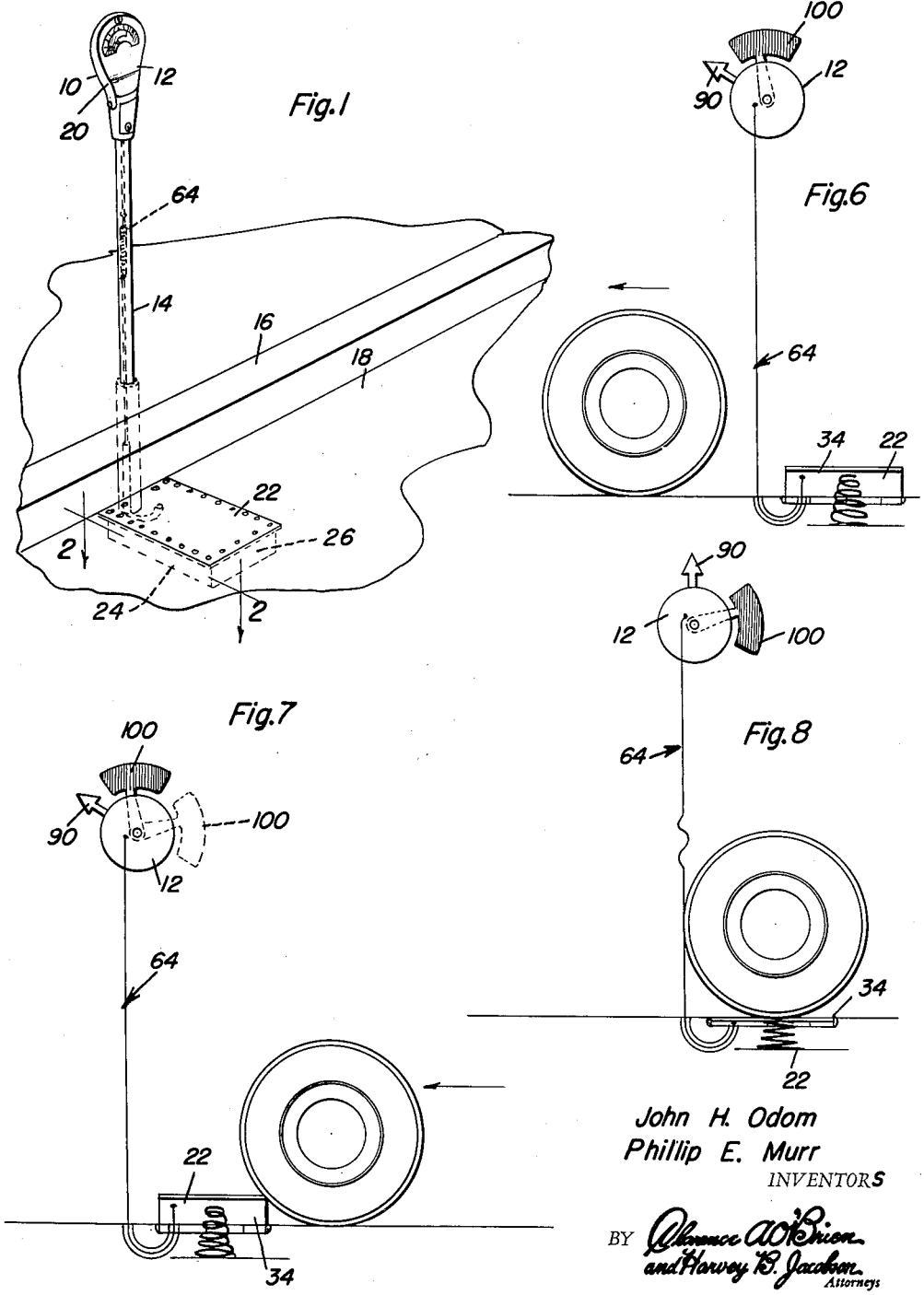
FIGURE 1 is a perspective view of a typical, conventional parking meter that is fitted with attachments causing it to operate in accordance with the invention.

The treadle is mounted in the street as shown in FIGURE 1. There are several unique features of our treadle, one being its actual construction with the resilient cover 30 functioning as a sealing member to keep rain, snow, ice, etc. out of the treadle casing. Anchor holes 61 in the bottom of the casing enable the casing to be firmly attached in place so that it will not move even after long periods of use. Another feature considered to be unique at the present time is the duplication of push rod 52 and post 51 on each side of the casing of the treadle. Both left hand and right hand installations may be made by using the same ground boxes or treadles 22.

The elastic or extensible control assembly 64 (FIGURE 5) of which the Bowden wire 53 and coupling 54 constitute a part, is principally located in the post 14 of the parking meter with a part of it located in the parking meter head 12. Bowden wire 53 is in part disposed in the post 14; spring 60 is located in post 14, coupling 65 which is identical to coupling 54, is located in post 14 and connects the hook 66 on the end of spring 60 adjustably to the Bowden wire 67. The sheath 68 of the Bowden wire is attached to the head of the meter, while the wire thereof has a spring clasp 69 on its end. Limit chain 70 is attached to a ring 71 on the clasp 69. Chain 72 capable of disabling operation of the meter is also attached to the same ring. The limit chain 70 has a spring 73 connected to a portion of limit chain 70 to form a loop 75. Spring 73 cooperating with the loop 75 and safety chain 70 forms a yielding stop that limits the extent of travel of operating chain 72.

Operating chain 72 has a hook 76 at its outer end which is attached to an ear 77 on cog wheel 80 constituting part of the usual pointer moving means of the parking meter mechanism. Safety chain 70 has a hook 78 at its outer end which is attached to a convenient part of the parking meter mechanism, for example bolt 79. These are all of the parts which we have added to the parking meter in order to change its operation so that it will function in accordance with the previous description.

In order to indicate the application and operation of the invention, operation of the exemplary parking meter is illustrated in FIGURES 4, and 9 through 11. The meter is described only to the extent necessary to apply the present invention thereto. The meter 10 is fully automatic in that the only stimulus for operation is the insertion of a coin 82. The coin 82 is fitted in a coin slot 83 on one side of the parking meter housing and in inserting the coin, an arm 84 is pushed (FIGURE 4) and this sets into motion a spring motor (not shown) which propels coin 82 in a circular path (see FIGURE 9) and in an upward direction. As the coin moves up its strikes a pin 85 on lever 86 and swings the lever about its pivot pin 88. The foregoing operation of one type of coin-operated mechanism is only exemplary, it being understood that any suitable coin-operated mechanism, forming no part of this invention, may be utilized to actuate the pin 85. Cog wheel 80 to which pointer 90 is secured, is ordinarily driven by the clock mechanism operated gear 91 that is enmeshed with an idler 92, the idler being enmeshed with the cog wheel 80. However, idler 92 is mounted on cam follower arm 93 capable of swinging about a pivot 94. Cam 95 on lever 86 swings the follower arm 93 in response to the coin caused movement of lever 86 and this separates the idler 92 from engagement with the clock actuated drive gear 91 (see FIGURE 9 showing gears 91 and 92 disengaged).

As a result of this disengagement of these gears cog wheel 80 which is the pointer moving means, is capable of being rotated by spring 97 that is attached at one end to ear 77 on wheel 80 and at the other end to a bolt 98 in the parking meter frame. A light spring 99 attached to a part of the parking meter mechanism and to the follower arm biases the cam follower arm 93 against the cam 95. This is the ordinary and normal operation of the parking meter and so far described, it is in no way altered by the presence of the invention. The same holds true for the elevation of the "violation" or "expired" flag 100.

It is at the end of an arm 102 that is mounted for pivotal movement about shaft 94 and that has a counterweight 104 at its end. The flag has a keeper 106 (FIGURE 11) at the extremity of its counterweight 104. This keeper is held by a dog 108 on spring loaded latch 111 (FIGURE 11) that is mounted for pivotal movement in the parking meter. This retains the flag in the "down" position. However, as the cog wheel 80 is slowly rotated by clock-driven gears 91 and 92 in a direction to move the pointer 90 to the zero marking on the graduated scale 114, stop 116 on cog wheel 80 pushes arm 120 that is attached to latch 111 in a direction to slide the keepers 106 and 108 from engagement with each other as seen in FIGURE 11. Spring 122 will return the latch 111 to the keeper engaging position, but this is only after the keepers 106 and 108 have become disengaged enabling the weight 104 to swing the flag 100 to the approximately vertical position. Pin 124 (FIGURE 9) on arm 86 is engageable in slot 126 of arm 130 that is mounted on a pivot eccentric to the pivot of flag arm 102. Arm 130 is attached to the flag arm so that when the coin pushes arm 86 in a direction to move the pointer 90 to the elevated position, the pin 124 engages in slot 126 and pushes flag arm 102 to the down position, at which latch 111 will hold the arm 102 and its flag 100 in the depressed position provided that stop 116 engages with arm 120 as shown in FIGURE 11. Operation of the exemplary parking member 10 for the purposes of this invention will therefore be apparent from the foregoing.

Our invention functions with the described parking meter in this way: When no motor vehicle wheel is on the treadle, the elongate control assembly 64 is taut (FIGURE 4) with the operating chain 72 attached to wheel 80 holding cog wheel 80 against rotational displacement by spring 97. When a coin is inserted, arm 86 is swung upward about the axis of pivot 88, thereby causing the gears 91 and 92 to become disengaged to ordinarily enable the spring 97 to rotationally bias the cog wheel 80 to the correct position. However, the chain 72 frustrates this operation, holding the cog wheel immovable against the force of spring 97. The patron loses his coin inasmuch as it falls into the coin box without causing the pointer 90 to move to the rental position. Flag 100, due to the structure of the parking meter mechanism is released. However, the cog wheel 80 did not move so that the ear 116 did not oscillate the latch 111 to engage the keepers 106 and 108. Therefore weight 104 is pulled by gravity to a down position and the flag 100 returns to the "expired" visible position.

When the motorist has a wheel on the treadle (FIGURES 8 and 10) and a coin is deposited, there is enough slack in the operating chain 72, cable or the like to permit spring 97 to oscillate cog wheel 80 to the rental position. Hence the actuation of the parking meter including the pointer 90 and the flag 100 is unaffected by the presence of the invention. But, as soon as the motorist moves his motor vehicle, operating chain 72 becomes taut and immediately returns cog 80 to the meter's expired position so that pointer 90 connected to cog 80 returns to the zero position. Cog 80 is thus rotated by chain 72 in the same direction as it was being slowly driven by the clock-driven gears 91 and 92. The cog wheel 80 being rotated more rapidly by the chain 72 than by the clock driven idler gear in mesh therewith, will cause the arm 93 on which the idler gear 92 is mounted, to be angularly displaced in the same direction of rotation and thereby disengage the clock drive from the idler gear and cog wheel 80, as will be apparent to anyone skilled in the art. This automatically releases the flag 100 so that it can return to its violation indicating position. Safety chain 70 is used only for the purpose of assuring against accidental mishaps which would cause the operating chain 172 to be excessively pulled and damage the parking meter.

As shown in FIGURE 12 the treadle 22 can be substituted by treadle 200. The ultimate actuation in the embodiment of FIGURE 12 and the treadle in the previously described embodiment is the same. The means of achieving the desired end, that is, to keep the chain 72 taut are different. Operating chain is connected to cable 202, wire or the like and a spring corresponding to spring 68 is interposed therebetween. The cable 202 is attached to a piston rod 204 that operates in cylinder 206. Liquid or pneumatic bellows 208, bladder or the like is disposed in a treadle casing 210, and there is a conduit 212 extending from the expansible chamber enclosed by the bellows, bladder, etc. and connected to the lower end of the cylinder 206. A return spring 214 for the treadle plate 216 is located within the treadle casing 210. The system illustrated in FIGURE 12 enables the cable 202 to remain taut. But as soon as the treadle is depressed, the fluid, either liquid or air in the system rushes into the botttom of cylinder 206 and pushes the piston rod 204 outwardly thereby putting slack in cable 202 and ultimately slacking the operating chain 72, cable or the like.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In a parking meter which has a pointer adapted to be moved to a parking space rental time, pointer moving means for so moving said pointer, treadle means adapted to be disposed in a street adjacent to the parking meter, control means connected with said pointer moving means effective to hold said pointer and prevent said pointer moving means from moving said pointer so long as said treadle means is unoccupied by a wheel of a motor vehicle, said control means including an elastic elongate means operatively connected to the treadle means and pointer moving means for rendering the control means effective in a taut condition of said control means, and rendering said control means ineffective slackened when in response to depression of the treadle means by the wheel of the vehicle.

2. The subject matter of claim 1 wherein said elastic elongate means includes a wire connected to said treadle means, an operating chain connected to said pointer moving means, and a spring operatively interconnecting said operating chain and wire to function as a shock absorber.

3. An attachment for a parking meter which has a pointer and a flag, pointer moving means for moving the pointer from an initial position to a time designation on the meter and also depressing the flag, said attachment comprising control means operatively connected with said pointer moving means effective to return the pointer to said initial position and prevent said pointer from moving from said initial position, treadle means actuatable in response to depression by the presence of a wheel of a motor vehicle, means operatively connecting said treadle means to said control means, said control means including yieldable means for rendering the control means slack in response to depression of the treadle means whereby to render said control means ineffective.

4. A selectively disabled attachment for controlling parts of an actuating mechanism of a parking meter, said attachment comprising a push and pull wire having a covering sheath, a pair of flexible elongate members attached to one end of said push and pull wire, means to attach said flexible elongate members to said parts including a shock attenuating spring operatively connected to one of said flexible elongate members, and disabling means connected to the opposite end of said push and pull wire to slide said wire in said sheath toward said flexible elongate members disabling said attachment by rendering the flexible members slack.

5. The attachment of claim 4 wherein said disabling means includes a cylinder provided with a piston rod to which the wire is fastened, and means connected with said cylinder operative for applying fluid under pressure to said cylinder and a spring supported depressible treadle for operating said last mentioned means.

References Cited in the file of this patent

UNITED STATES PATENTS

| 2,152,061 | Kliesrath | Mar. 28, 1939 |
| 2,462,610 | Burum | Feb. 22, 1949 |
| 2,519,634 | Burton | Aug. 22, 1950 |
| 2,546,433 | Dick | Mar. 27, 1951 |
| 2,553,260 | Kifer | May 15, 1951 |
| 2,815,108 | Fitzpatrick | Dec. 3, 1957 |
| 2,821,283 | Cruse | Jan. 28, 1958 |